United States Patent Office.

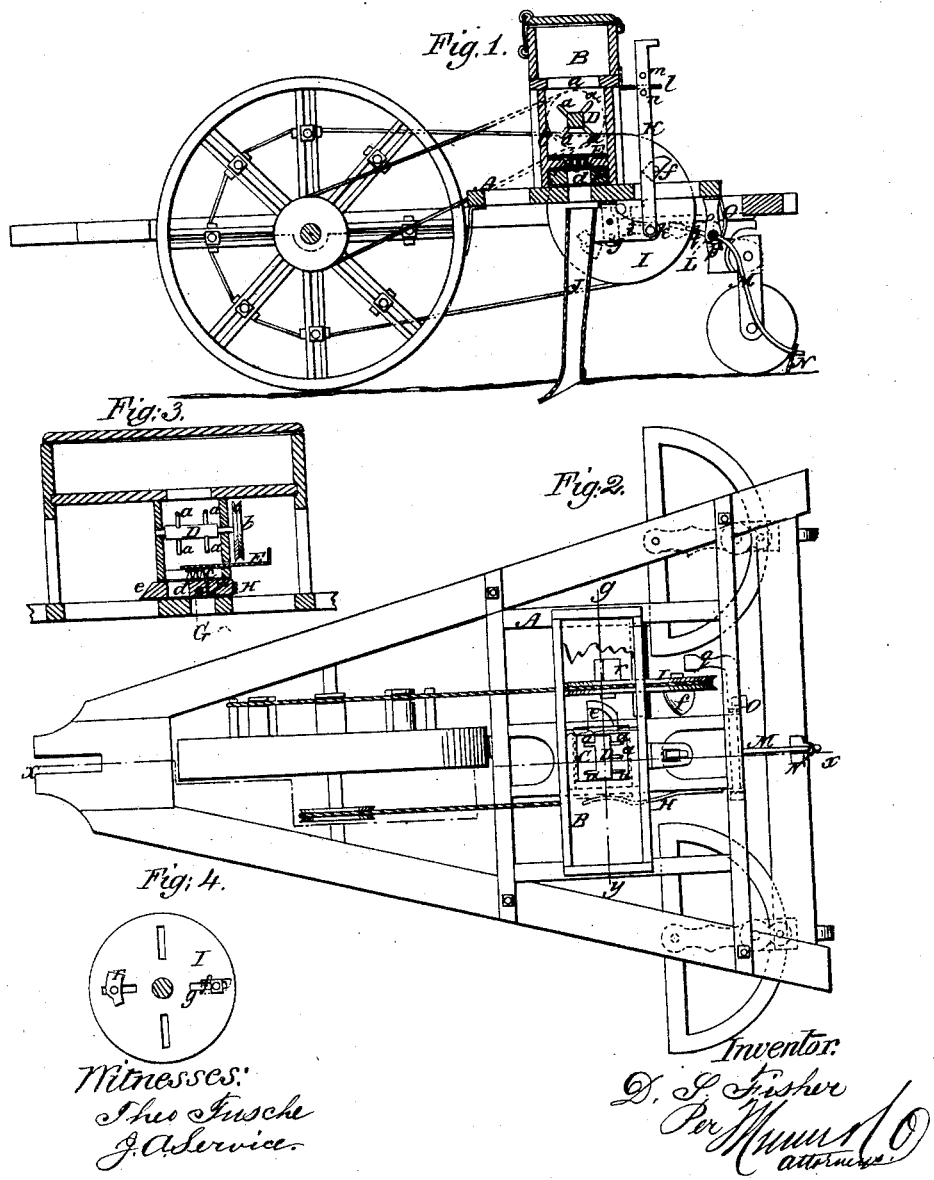

D. S. FISHER, OF CEDAR SPRING, INDIANA.

*Letters Patent No. 65,197, dated May 28, 1867.*

---

CORN-PLANTER

---

*The Schedule referred to in these Letters Patent and making part of the same.*

---

TO ALL WHOM IT MAY CONCERN:

Be it known that I, D. S. FISHER, of Cedar Spring, in the county of Harrison, and State of Indiana, have invented a new and improved Corn-Planter; and I do hereby declare that the following is a full, clear, and exact description thereof, which will enable others skilled in the art to make and use the same, reference being had to the accompanying drawings, forming part of this specification.

This invention relates to a new and improved machine for planting corn and other seed in hills or drills; and it consists of a novel seed-distributing device and covering mechanism, all arranged to operate as hereinafter fully shown and described. In the accompanying sheet of drawings—

Figure 1 is a side sectional view of my invention, taken in the line $x\ x$, fig. 2.

Figure 2, a plan or top view of the same.

Figure 3, a detached vertical section of the seed-box, taken in the line $y\ y$, fig. 2.

Figure 4, a detached side view of the wheel by which the seed-distributing and covering mechanism are operated.

Similar letters of reference indicate like parts.

My corn-planter is bolted on a frame mounted on wheels, and shown in red in figs. 1 and 2. All the parts pertaining to my invention are shown in black, which is composed of a frame, A, secured on the mounted frame by bolts, and having upon it a seed-box, B, which communicates, by means of an opening, $a$, in its bottom, with a box, C, underneath, in which a horizontal shaft, D, is placed provided with radial pins $a$. One of the journals of this shaft extends through one of the sides of the box C, and has a pulley, $b$, upon it, which is rotated by a belt from the axle of the front wheel of the frame on which my invention is bolted, as shown in red in fig. 2. In the lower part of the box C there is placed a slide, E, having a cut-off brush, $c$, underneath it, and directly underneath the slide E there is a slide, F, having an opening, $d$, in it, which may be increased or diminished in capacity by means of an adjustable gauge, G, (see fig. 3.) The slide F has a spring, H, bearing against one end of it, and the opposite end has a projecting arm, $e$, the upper surface of which is bevelled for projections $f$, one or more, on a wheel, I, to act against. These projections $f$ are fitted in radial slots, $g$, in the wheel I, as shown in fig. 4, to admit of them being adjusted nearer to or farther from the periphery of wheel I, as may be desired. This wheel I is rotated by a chain or band from a series of adjustable segments on the front drive-wheels, as shown in red in figs. 1 and 2, the adjustment of these segments further towards or from the axle admitting of the corn being dropped at greater or less distances apart, as may be desired. It will be seen that the slide F is operated by means of the projections $f$ and the spring H, and the opening $d$ in the slide is filled with seed by drawing the slide E a little outward, the filled opening $d$ being shoved by the projections $f$ underneath the cut-off brush $c$ and over a hole, $h$, in the bottom of box C, through which the seed passes into a tube, J, the lower end of the latter being of such a shape as to make a furrow to receive the seed conveyed to it by the tube J. The shaft D with its pins serves to feed the seed through the space formed by drawing out the slide E. This tube J is provided with a projecting bar, $i$, at its rear side, and this bar is pivoted between pendent ears, $j$, attached to the frame A. The rear end of the bar $i$ is connected by a pivot, $k$, to the lower end of an upright bar, K, which passes through a guide, $l$, secured to the rear side of the seed-box, the bar K having holes, $m$, made in it through which wooden pins, $n$, pass to secure the tube J in a working position. The lower pin, however, in case of the lower end of the tube meeting with an obstruction, will break, and admit of the tube being forced back, so that it may pass over the obstruction. To the rear part of the frame A there are attached two pendent bearings, $o\ o$, in which a shaft, L, is fitted. To this shaft there is attached a rod, M, having a hoe, N, at its outer end, which is kept up from the surface of the ground by a spring, O, which bears against an arm, $p$, on shaft L. This shaft L has an arm, $q$, at one end, against which a projection, $r$, on the wheel I acts and throws down the hoe, so that the latter will draw the earth over the seed, the hoe being thrown up by the spring O before it reaches the seed. By this means the seed will be planted at suitable distances apart and properly covered.

I would remark that the wheel I may have one or more projections, $f$, applied to it, according to the distance it is desired to plant the seed apart.

Having thus described my invention, I claim as new, and desire to secure by Letters Patent—

1. The rotating shaft D provided with pins $a$ and the slide E, in combination with the reciprocating slide F, spring H, and the wheel I, provided with one or more projections $f$, all arranged to operate in the manner substantially as and for the purpose set forth.

2. The hoe N, attached to the shaft L, in combination with the spring O and the wheel I, provided with one or more projections $r$, and the arm $q$ on one end of the shaft L, all arranged to operate in the manner substantially as and for the purpose set forth.

D. S. FISHER.

Witnesses:
J. EMMET ENLOW,
GEO. W. LAMB.